United States Patent
Endo et al.

(10) Patent No.: US 7,292,978 B2
(45) Date of Patent: Nov. 6, 2007

(54) SHORTCUT NAMES FOR USE IN A SPEECH RECOGNITION SYSTEM

(75) Inventors: Norikazu Endo, Cupertino, CA (US); Benjamin K. Reaves, Mountain View, CA (US); Babak Hodjat, Santa Clara, CA (US); Kanae Ishii, Tokyo (JP); Makoto Kurahashi, Kanagawa (JP); Masahiko Funaki, Chiba (JP)

(73) Assignees: Toyota InfoTechnology Center Co., Ltd., Tokyo (JP); iAnywhere Solutions, Inc., Dublin, CA (US)

( * ) Notice: Subject to any disclaimer, the term of this patent is extended or adjusted under 35 U.S.C. 154(b) by 739 days.

(21) Appl. No.: 10/728,600

(22) Filed: Dec. 4, 2003

(65) Prior Publication Data

US 2005/0125234 A1    Jun. 9, 2005

(51) Int. Cl.
G10L 15/00    (2006.01)
(52) U.S. Cl. .................... 704/243; 704/231; 704/244; 701/209
(58) Field of Classification Search ................ 704/231, 704/243, 246, 244, 270, 270.1; 701/209
See application file for complete search history.

(56) References Cited

U.S. PATENT DOCUMENTS

| | | | |
|---|---|---|---|
| 4,270,182 A | 5/1981 | Asija | |
| 5,007,019 A | 4/1991 | Squillante et al. | |
| 5,734,987 A | 3/1998 | Shiono et al. | |
| 5,890,146 A | 3/1999 | Wavish et al. | |
| 5,974,413 A | 10/1999 | Beauregard et al. | |
| 6,006,225 A | 12/1999 | Bowman et al. | |
| 6,029,165 A | 2/2000 | Gable | |

(Continued)

FOREIGN PATENT DOCUMENTS

JP    9-113299 A    5/1997

(Continued)

OTHER PUBLICATIONS

Thomas Kuhme, "Adaptive Action Prompting—A Complementary Aid to Support Task-Oriented Interaction in Explorative User Interfaces", Siemens Corporate Research and Development Otto-Hahn-Ring 6, 8000 Munich 8, Germany, email: kuehme@zfe.siemens.de, 1993.

(Continued)

*Primary Examiner*—Huyen X. Vo
(74) *Attorney, Agent, or Firm*—Fenwick & West LLP

(57) ABSTRACT

Shortcut names corresponding to flagged locations or frequently stated destinations, phrases, or sentences are registered, maintained, used, and deregistered in a speech recognition system. If a flagged location or a frequently stated destination, phrase, or sentence is received by the speech recognition system, the user is prompted to provide a shortcut name corresponding to the frequently stated destination, phrase, or sentence in the form of speech, which is then recognized by speech recognition and registered to a personal profile of the user. The shortcut name is also added to a grammar database of the speech recognition system, so that the speech recognition system may recognize the shortcut name itself. The shortcut name may also be deleted, when speech received from a user contains a shortcut name but the user did not intend the shortcut name to mean the corresponding destination, phrase, or sentence.

20 Claims, 5 Drawing Sheets

U.S. PATENT DOCUMENTS

| | | | |
|---|---|---|---|
| 6,144,989 | A | 11/2000 | Hodjat et al. |
| 6,243,459 | B1 | 6/2001 | Cannon et al. |
| 6,260,059 | B1 | 7/2001 | Ueno et al. |
| 6,385,535 | B2 * | 5/2002 | Ohishi et al. ............... 701/209 |
| 2003/0063113 | A1 | 4/2003 | Andrae |

FOREIGN PATENT DOCUMENTS

| | | |
|---|---|---|
| JP | 2000-29585 A | 1/2000 |
| JP | 2000-122685 A | 4/2000 |
| JP | 2000-259180 A | 9/2000 |
| JP | 2000-322088 A | 11/2000 |
| JP | 2001-27540 A | 1/2001 |
| JP | 2001-216129 A | 8/2001 |
| JP | 2002-5680 A | 1/2002 |
| JP | 2002-123290 A | 4/2002 |
| JP | 2003-5897 A | 1/2003 |
| JP | 2004-106797 A | 4/2004 |

OTHER PUBLICATIONS

International Search Report for International Application No. PCT/JP2004/018447, dated Mar. 22, 2005.

Written Opinion of the International Searching Authority for International Application No. PCT/JP2004/018447, dated Mar. 22, 2005.

Rankin, Paul J., "Context-Aware Mobile Phones: The Difference Between Pull and Push, Restoring The Importance of Place," Human Computer Interaction International, Aug. 4-10, 2001, New Orleans, LA.

"Developing Flexible Say Anything Grammars," Student Guide, Nuance Communications, Inc. Student Guide, 79 pages.

U.S. Appl. No. 10/326,492, filed Dec. 20, 2002, Treadgold et al.

* cited by examiner

| John Doe | | | | |
|---|---|---|---|---|
| 100 A Street, Palo Alto, California | 37.4447, -122.1608 | | 1 | 12:49,10/25/2003 |
| 200 B Street, Los Altos, California | 37.4567, -122.1702 | | 1 | 14:20,10/27/2003 |
| 300 C Street, Mountain View, California | 37.5012, -122.1503 | | 2 | 07:30,10/28/2003 15:24, 10/29/2003 |
| BurgerQueen, 11 D St. Sunnyvale, California | 37.4447, -122.1745 | | 2 | 09:50,10/24/2003 10:45,10/26/2003 |
| My Work | 1 | | 4009 Miranda Avenue, Palo Alto, California | |
| My Grocery Store | 3 | | 500 A Street, Santa Clara, California | |
| John's House | 1 | | 600 B Street, Redwood City, California | |
| Driving Range | 2 | | 700 C Street, Cupertino, California | |
| My Favorite Japanese Restaurant | 1 | | 800 D Street, San Jose, California | |

FIG. 4

SHORTCUT NAMES FOR USE IN A SPEECH RECOGNITION SYSTEM

TECHNICAL FIELD

The present invention relates generally to speech recognition systems, and more specifically, to shortcut names for use in speech recognition systems.

BACKGROUND OF THE INVENTION

Vehicle navigation systems are being widely used in modern automobiles. In a conventional navigation system, the user asks for directions to a particular destination by voice (speech) or by manually typing in a destination address through input keys or touch sensitive screens. The navigation systems typically have Global Positioning System (GPS) capabilities to determine the current location of the automobile. The navigation system responds to the user's request for directions to a destination by displaying the directions to the location to the user, along with voice instructions or visual instructions corresponding to the directions to the destination.

Users of the navigation systems interact with the navigation systems by a variety of input methods, including speech input to speech recognition systems, manual input using keys or touch sensitive screens, and the like. The speech input method is popular in navigation systems, especially because the speech input method minimizes interference with the user's driving of the vehicle.

When a user interacts with the navigation system using speech input, the user typically asks for directions to a destination by stating the address of the destination. For example, the user may ask for directions to 4009 Miranda Avenue, Palo Alto, Calif., by stating "Take me to 4009 Miranda Avenue in Palo Alto, Calif." to the navigation system. The speech recognition system of the navigation system recognizes the request using conventional speech recognition methods and shows to the user the directions to the destination.

If the user requests the directions to a previously requested destination twice or more, that destination is likely to be a frequently requested destination. However, in conventional navigation systems, the user still has to state the complete address of such destination to obtain directions to the frequently requested destination. Some conventional navigation systems store the history of destinations requested by a user and allow the user to view the list to find a previously requested destination. However, this is cumbersome for the user of the navigation system and interferes with the user's driving of the automobile.

Therefore, there is a need for a method and system for conveniently inputting destinations by speech in a navigation system. There is also a need for a method and system for minimizing the interference with the user's driving of the automobile, when the driver requests directions to a destination using a navigation system. There is also a need for a method and system for stating phrases or sentences to a speech recognition system in a convenient and shorter way.

SUMMARY OF INVENTION

The present invention provides a method and a system for registering, maintaining, using, and deregistering shortcut names corresponding to frequently stated destinations, phrases, or sentences, for use in a speech recognition system. The speech recognition system may be one used with a vehicle navigation system, or one used as an interaction means for any other type of system, or even a stand-alone speech recognition system.

In one embodiment, a shortcut name corresponding to flagged destination or a frequently stated destination, phrase, or sentence is registered for use with a speech recognition system. A destination, phrase, or sentence is received from a user, and it is determined whether the received destination, phrase, or sentence is a frequently stated one. If so, the user is asked whether a shortcut name should be registered for the received destination, phrase, or sentence, and such shortcut name is received from the user in the form of speech and is recognized by speech recognition. The shortcut name is registered to a personal profile of the user, and also added to a grammar database of the speech recognition system, so that the speech recognition system may recognize the shortcut name itself. The received destination, phrase, or sentence is also stored as destination history data in the user's personal profile, so that it can be used to determine whether a later received destination, phrase, or sentence is a frequently stated one. In the case of frequently stated destinations, requests for destinations that were stated differently may be stored as the same destination in the destination history based on the Geo-codes or addresses corresponding to the stated destinations.

In another embodiment, a shortcut name for a location flagged by a user of the navigation system may be registered. When the user flags a location on the navigation system, the user is prompted to register a shortcut name for the flagged location. The shortcut name is registered to a personal profile of the user, and also added to a grammar database of the speech recognition system, so that the speech recognition system may recognize the shortcut name itself.

In another embodiment, a shortcut name that was previously registered in the user's profile may be deleted by the user. In this regard, speech is received from a user, and speech recognition is carried out on the received speech. Then, it is determined whether the received speech includes a previously registered shortcut name corresponding to a frequently stated destination, phrase, or sentence. If so, the user is asked whether the destination, phrase, or sentence corresponding to the shortcut name is the one intended by the user. If it is not, then the user is asked whether the shortcut name should be deleted from the personal profile of the user upon, and it is deleted upon approval by the user. If it is, then the corresponding destination, phrase, or sentence is substituted for the recognized shortcut name. The frequency of use of each shortcut name is monitored.

In another embodiment, the present invention provides a vehicle navigation system capable of registering, maintaining, using, and deregistering a shortcut name corresponding to a frequently requested destination for use with a speech recognition system. The speech recognition system is one input to the navigation system. The navigation system includes a user profile database including a plurality of shortcut names and a plurality of shortcut destinations corresponding to the shortcut names, a shortcut registration module for registering and deregistering the shortcut names and the corresponding shortcut destinations in the user profile database, and a speech recognition module recognizing the shortcut names included in speech input to the vehicle navigation system for registration of the shortcut names to or deregistration of the shortcut names from the user profile database. The speech recognition module may determine whether the input speech includes one of the shortcut names and substitute the corresponding shortcut destination for the determined shortcut name.

The user profile database may further include a list of destination history and destination counts each corresponding to the list of destination history. The list of destination history indicates destinations to which directions were at least once requested by a user, and the destination counts indicate the number of times directions to the corresponding destinations were requested by the user.

In one embodiment, the speech recognition module includes a grammar database storing grammar to be compared with the input speech for speech recognition. The shortcut names in the user's personal profile are also stored as part of the grammar, so that the speech recognition module may acoustically compare the input speech with the shortcut names included in the grammar.

BRIEF DESCRIPTION OF THE DRAWINGS

The teachings of the present invention can be readily understood by considering the following detailed description in conjunction with the accompanying drawings.

FIG. 4 is a diagram illustrating an example of a database entry corresponding to one user in the user profile database of the vehicle navigation system of FIG. 3.

DETAILED DESCRIPTION OF EMBODIMENTS

Figure 1A:
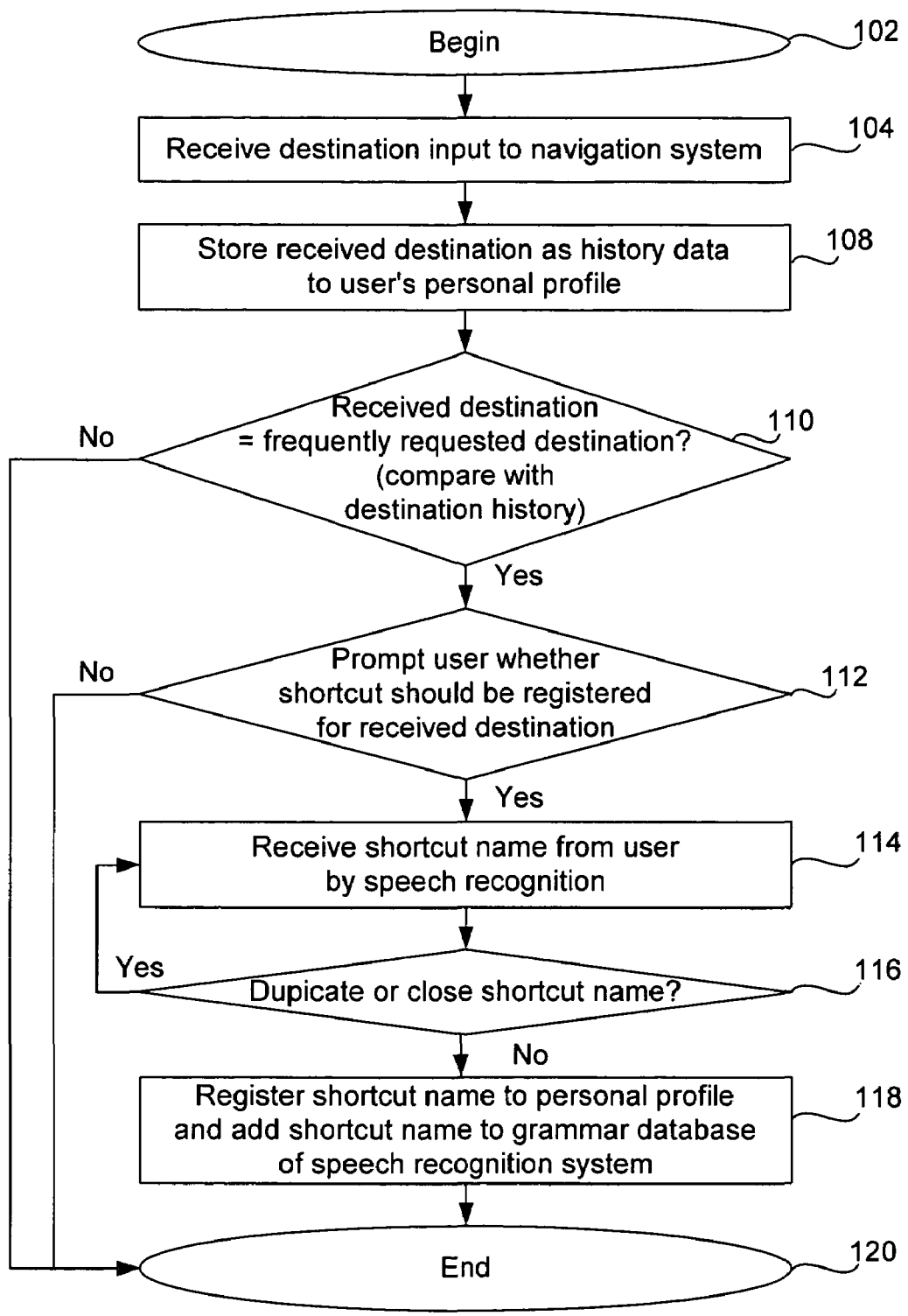
FIG. 1A is a flowchart illustrating a method of registering a shortcut name corresponding to a frequently requested destination for use with a speech recognition system in a vehicle navigation system, according to one embodiment of the present invention.

The embodiments of the present invention will be described below with reference to the accompanying drawings. Like reference numerals are used for like elements in the accompanying drawings.

FIG. 1A is a flowchart illustrating a method of registering a shortcut name corresponding to a frequently requested destination for a speech recognition system (not shown) used in a vehicle navigation system (not shown), according to one embodiment of the present invention. The method of FIG. 1A enables a user of the navigation system to register shortcut names for frequently requested destinations, for use with the speech recognition system in the navigation system.

As the process begins 102, the navigation system receives 104 a destination to which directions from the current location of the vehicle is requested by the user. The destination may be input to the navigation system 300 (FIG. 3) by speech through a speech recognition system 304 (FIG. 3), by manually typing in a destination, or by any other input means available to the navigation system. The received destination is stored 108 as destination history data in a personal profile database corresponding to the user. The destination history data includes a list of the destinations requested by the user and destination count keeping track of the number of times the corresponding destination was requested by the user.

Then, it is determined 110 whether the received destination is a frequently requested destination by comparing the received destination with the destination history data stored in the user's personal profile. In one embodiment, it is determined that the received destination is a frequently requested destination corresponding to the same location if the same destination was requested more than a certain number of times, e.g., twice (more than once). In another embodiment, it is determined that the received destination is a frequently requested destination if the same destination was requested more than a certain number of times in a given period of time, e.g., more than once in 72 hours. If the received destination is not a frequently requested destination, the process ends 120. If the received destination is determined to be a frequently requested destination, then the user is prompted 112 to decide whether a shortcut should be registered for the received destination. If not, the process ends 120.

If the user decides to register a shortcut, then the shortcut name corresponding to the received destination is received 114 using speech recognition. In other words, the user states a shortcut name in the form of speech, which is then recognized by a speech recognition system. Therefore, the speech recognition system performs speech recognition on the suggested shortcut name itself. Then, the recognized shortcut name is checked 116 to determine if the shortcut name as a whole is duplicative of, or has a pronunciation similar to, a shortcut name or a recognizable word stored in the grammar database (not shown) of the speech recognition system, until a unique shortcut name is received. If the shortcut name is duplicative or has a close pronunciation, steps 114 and 116 are repeated. The shortcut name is registered in the user's personal profile 118, and the same shortcut name is also added 118 to the grammar of the speech recognition system in the navigation system, so that the speech recognition system can recognize the shortcut name like an ordinary word. Then, the process ends 120. In another embodiment, a predetermined number of words (e.g., the first two words) in the recognized shortcut name may be registered as the shortcut name in step 118, rather than registering the entire recognized shortcut name.

Although the method of FIG. 1A was described in the context of a speech recognition system used in a navigation system, a similar method may be used to registered shortcut names corresponding to longer speech (phrases or sentences) in general speech recognition systems that are used independently or in combination with other types of systems other than a navigation system. For example, if the speech recognition system recognizes that the same sentence or phrase has been stated by the user twice, the speech recognition system may ask the user to register a shortcut name corresponding to the sentence or phrase, so that the user may later use the shortcut name rather than stating the entire sentence or phrase to the speech recognition systems. Therefore, the present invention is not limited to a speech recognition system used in navigation systems, but covers shortcut names used with any type of speech recognition systems.

Figure 1B:
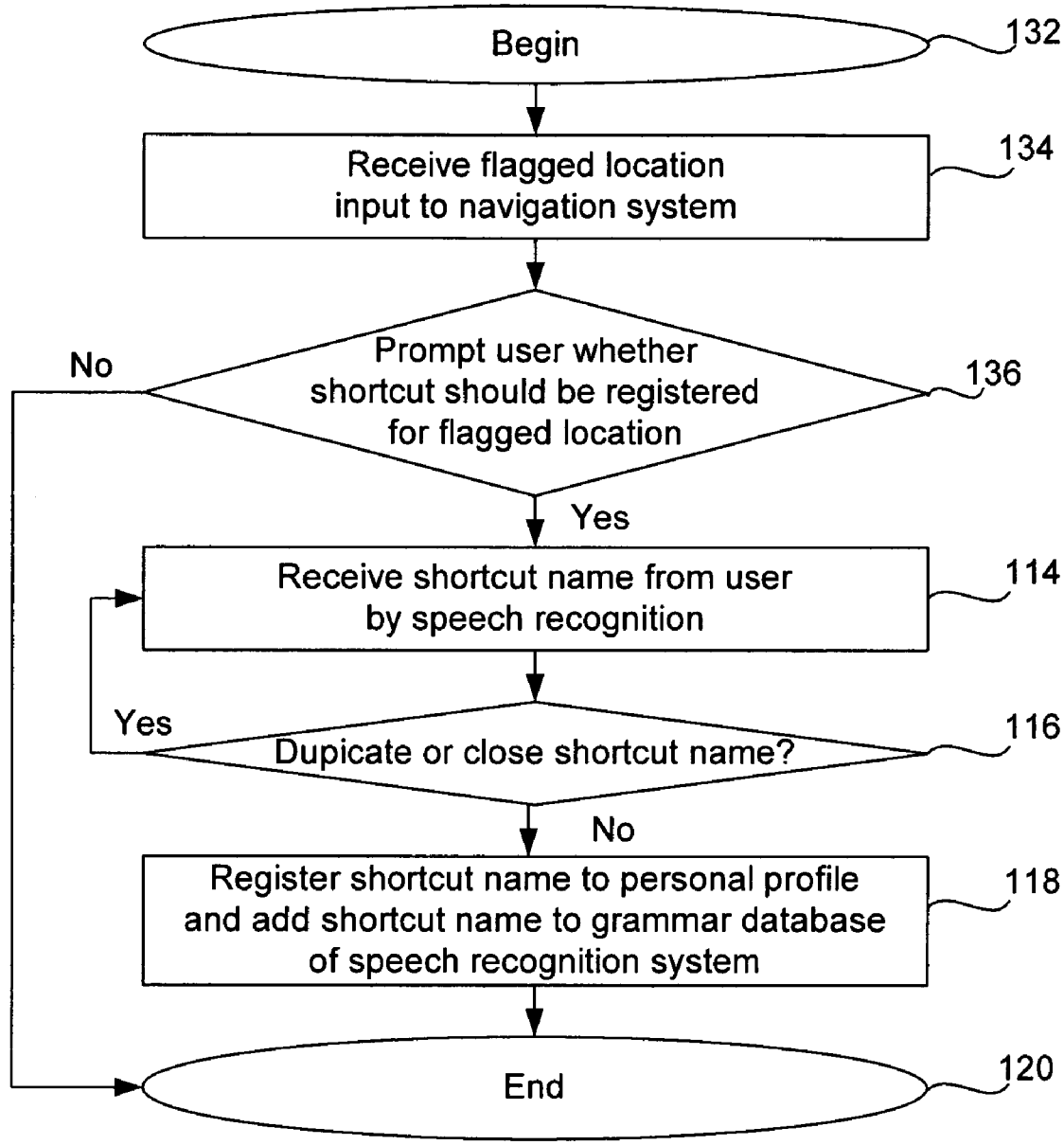
FIG. 1B is a flowchart illustrating a method of registering a shortcut name corresponding to a location flagged by a user for use with a speech recognition system in a vehicle navigation system, according to another embodiment of the present invention.

FIG. 1B is a flowchart illustrating a method of registering a shortcut name corresponding to a location flagged by a user for use with a speech recognition system 304 in a vehicle navigation system 300, according to another embodiment of the present invention. The method of FIG. 1B is identical to the method of FIG. 1A, except that a shortcut name corresponding to a location flagged by the user of the navigation system is registered as described in steps 134 and 136.

As the process begins 132, the navigation system receives 134 a flagged location from a user. For example, the user may be driving on the road and notice a point of interest that he wishes to remember. In such case, the user may flag such location or point of interest on the navigation system by marking the location on an interactive map displayed on the navigation system. The marking may be done by a verbal command or by an input command through an input device to the navigation system.

Once a flagged location is received 134, the user is prompted 136 to decide whether a shortcut name should be registered for the flagged destination. If not, the process ends 120. If so, then the process continues to steps 114, 116, 118, 120, which are identical to steps 114, 116, 118, 120 described in FIG. IA. In this embodiment, it is not determined whether the flagged destination is a frequently requested destination, because it is unlikely that the user may flag a destination if the destination is already a frequently requested destination while it is likely that the user may want to have a convenient way of requesting such flagged destination to the navigation system later on by registering a shortcut name for it.

Figure 2:
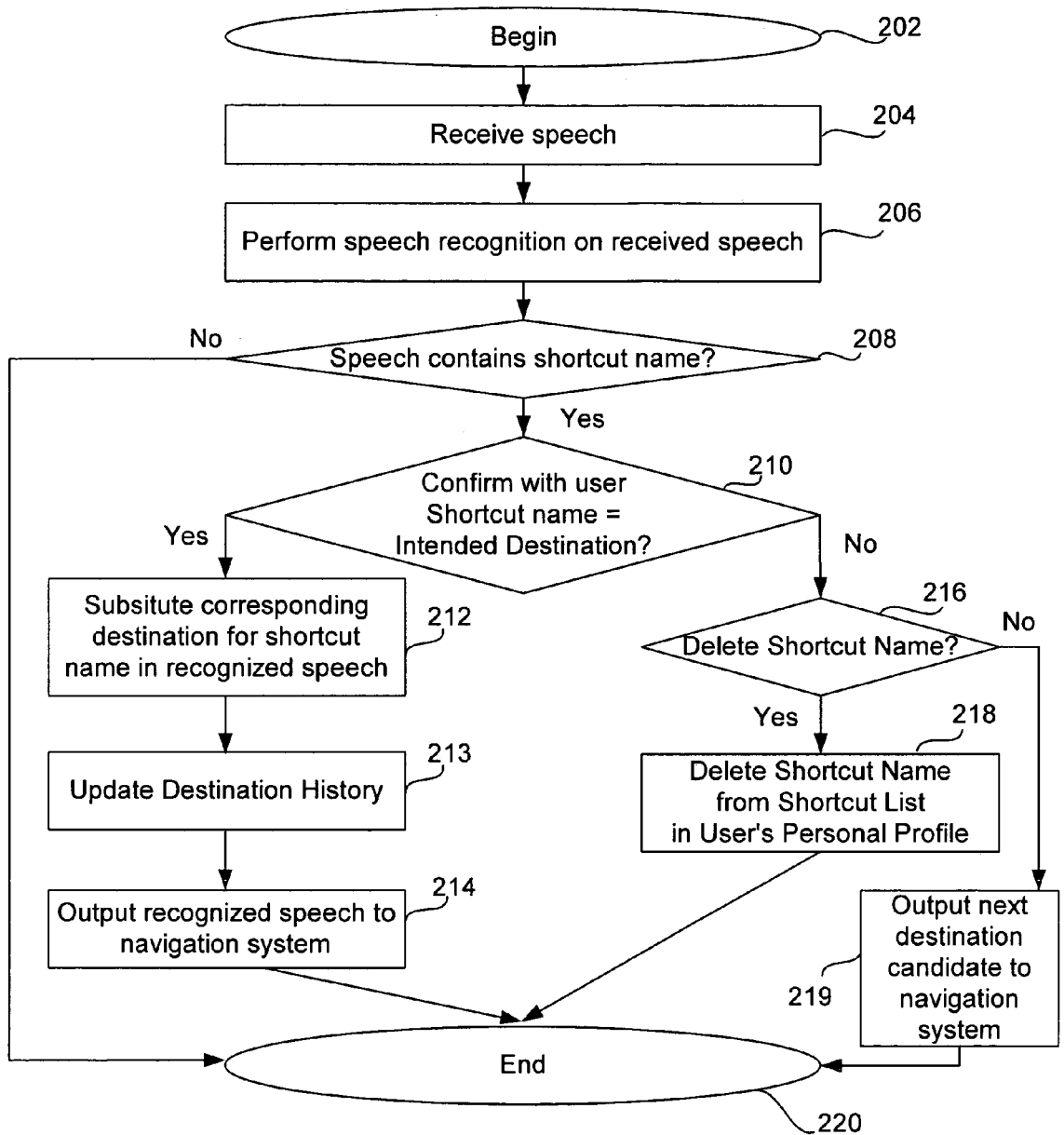
FIG. 2 is a flowchart illustrating a method of using and/or deregistering a shortcut name corresponding to a frequently requested destination for use with a speech recognition system in a navigation system, according to one embodiment of the present invention.

FIG. 2 is a flowchart illustrating a method of using and/or deregistering a shortcut name corresponding to a frequently requested destination for a speech recognition system used in a navigation system, according to one embodiment of the present invention. The method of FIG. 2 enables a user of the navigation system to use and/or deregister shortcut names for frequently requested destinations that were previously registered, for use with the speech recognition system in the navigation system. As the process begins 202, the speech recognition system receives 204 speech from the user and performs 206 speech recognition on the received speech. Then, it is determined 208 whether a shortcut name is included within the speech. If the speech does not contain a shortcut name, then the process ends 220.

If the speech contains a shortcut name, the user is asked to confirm 210 whether the destination corresponding to the shortcut name is the intended destination. If the destination corresponding to the shortcut name is the intended destination, the destination corresponding to the shortcut name is substituted 212 for the shortcut name in the recognized speech, the destination history data is updated 213 to reflect that the destination corresponding to the shortcut name was requested, and the recognized speech is output 214 to the navigation system. Also, although not shown in FIG. 2, a shortcut count keeping track of the number of times the shortcut name was used may be increased. If the destination corresponding to the shortcut name is not the intended destination, then the user is asked 216 if the shortcut name should be deleted from the shortcut list. If the user replies in the negative, the next destination candidate is output 219 to the navigation system, and the process ends 220. If the user replies in the affirmative, the shortcut name is deleted from the shortcut list in the user's personal profile 218 and the process ends 220.

Although the method of FIG. 2 is described in the context of a speech recognition system used in a navigation system, a similar method may be used to register and deregister shortcut names corresponding to longer speech (e.g., phrases or sentences) in general speech recognition systems that are used independently or in combination with other types of systems other than a navigation system. For example, if the speech recognition system recognizes that a shortcut name was used in a speech, the speech recognition system may substitute a corresponding longer speech (phrase or sentence) for the shortcut name during the speech recognition process or deregister the shortcut name from the shortcut list if the user wishes to do so. Therefore, the present invention is not limited to a speech recognition system used in navigation systems, but covers shortcut names used with any type of speech recognition systems. Also, although not described in FIG. 2, the shortcut name may also be deleted by a simple request from the user by voice or by manual input of commands.

Figure 3:
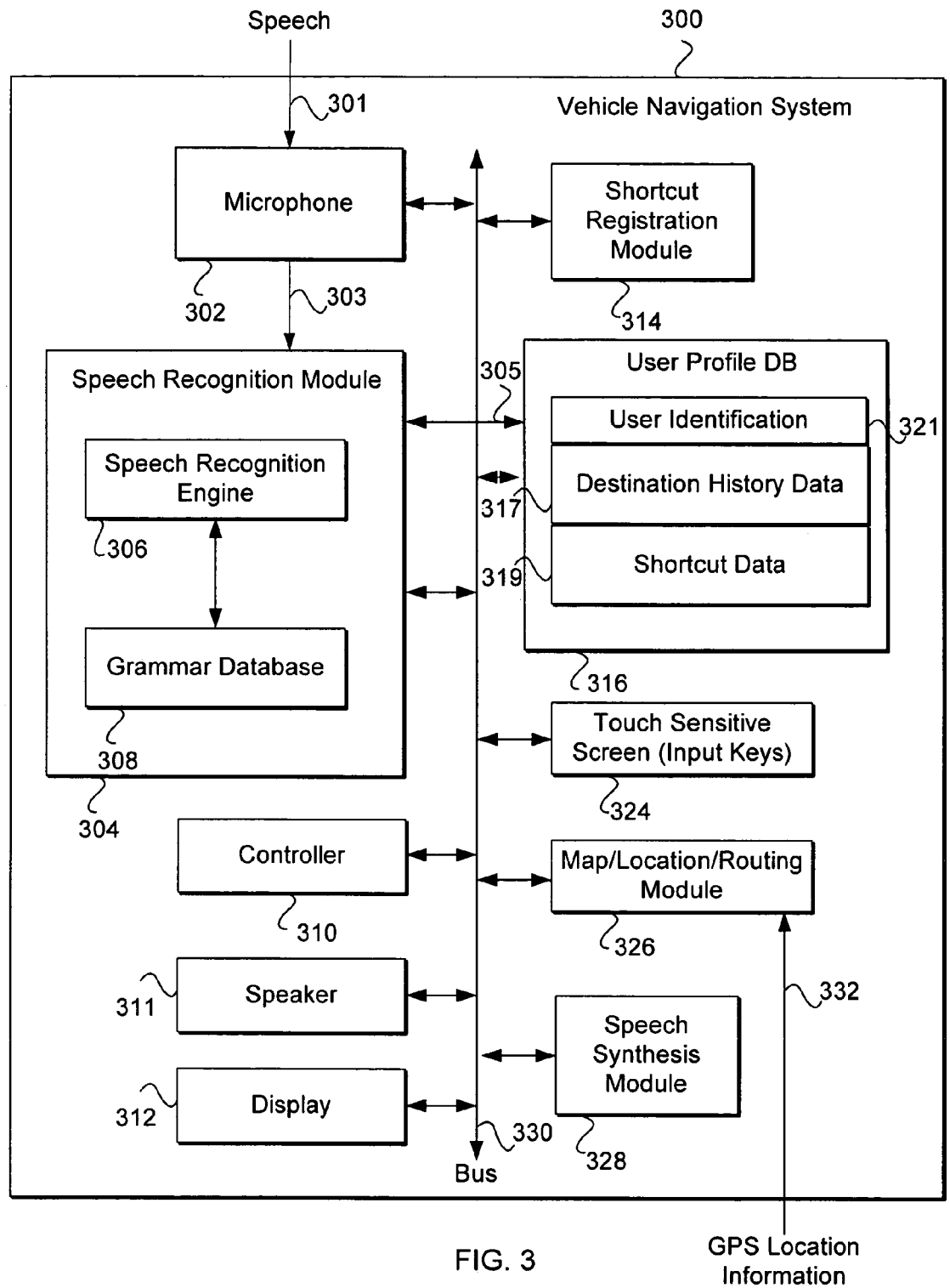
FIG. 3 is a block diagram illustrating a navigation system with speech recognition capabilities utilizing a shortcut name list, according to one embodiment of the present invention.

FIG. 3 is a block diagram illustrating a navigation system 300 with speech recognition capabilities utilizing a shortcut name list, according to one embodiment of the present invention. The navigation system 300 includes a microphone 302, a speech recognition module 304, a controller 310, a speaker 311, a display 312, a shortcut registration module 314, a user profile database (DB) 316, a touch sensitive screen 324, a map/location/routing module 326, and a speech synthesis module 328. These components communicate with one another via a bus 330.

The navigation system 300 may be, for example, an on-board computer in an automobile. The navigation system 300 of the present invention is capable of utilizing a shortcut list for speech recognition according to the present invention, in addition to the typical functions of a conventional vehicle navigation system such as displaying the location of the vehicle in which the vehicle navigation system 300 resides on a displayed map and showing directions to a particular destination from the current location of the vehicle. Although the navigation system 300 is described herein as an on-board computer in an automobile, the navigation system 300 may also be off-board the automobile, for example, within a call center or server wirelessly connected to the automobile via a cellular telephone interface or other wireless communication channels or other communication interfaces. The navigation system 300 may also be partitioned such that certain parts (e.g., microphone, speaker, display, touch sensitive screen etc.) of the navigation system 300 is on-board the automobile and other parts of the navigation system 300 are off-board the automobile within a call center wirelessly connected to the automobile via a cellular telephone or other wireless communication channel or other communication interfaces.

Referring to FIG. 3, the microphone 302 receives speech 301 input to the navigation system 300 by a user (not shown) and converts the speech to an electrical signal 303 that can be used with the speech recognition module 304. The speech recognition module 304 includes a speech recognition engine 306 and a grammar database 308. The grammar database 308 stores various grammars (acoustic and/or linguistic models) for use by the speech recognition engine 306. The speech recognition engine 306 compares the speech signal 303 with the grammars from the grammar database 308 to perform speech recognition on the received speech.

The grammar database 308 also contains previously registered shortcut names as part of the grammars stored therein, as explained with regard to step 118 of FIG. 1. Therefore, the speech recognition engine 306 may compare the acoustic characteristics of the speech signal 303 with registered shortcut names to recognize shortcut names in the speech as explained with regard to step 208 of FIG. 2. When the shortcut name is recognized, the corresponding shortcut destination is retrieved from the user profile DB to substitute the shortcut name, as explained with regard to step 212 of FIG. 2. The speech recognition module 304 also recognizes shortcut names during the registration step 114 of the shortcut name as illustrated in FIG. 1. The grammar database 308 can be stored in any type of storage device, such as hard disks, flash memories, DRAMs, or SRAMs, and the like. The speech recognition engine 306 may be commercially available, conventional speech recognition software.

The user profile DB 316 stores user identification data 321, destination history data 317 and shortcut data 319. The user identification 321 is information identifying a particular user of the navigation system 300 by name, user identification number, log-on name, or the like. The destination history data 317 is a list of destinations (addresses or Geo-codes) to which directions were requested by the user of the navigation system 300 with related information, and includes the list of destination history, Geo-codes corresponding to each destination, destination count indicating the number of times the destination was requested, and the dates/times when the destination was requested. The shortcut data 319 are a list of shortcut names for frequently visited (or requested) destinations that are registered by the user corresponding to the user identification 321, in accordance with a shortcut name registration method such as that described in FIGS. 1A and 1B, and related information, and includes a list of shortcut names, a count of the number of times the corresponding shortcut name was used, and a list of shortcut destinations (addresses) corresponding to the shortcut names as registered for each user of the navigation system 300. The destination history data 317 and the shortcut data 319 will be explained in more detail with reference to FIG. 4. The user profile DB 316 may include entries for a plurality of users.

The shortcut registration module 314 is a memory device storing software for performing the registration and deregistration of shortcut names according to methods as described in, e.g., FIGS. 1A, 1B, and 2. The map/location/routing module 326 stores conventional navigation system software for determining directions from the current location to a requested destination. The map/location/routing module 326 also stores software for keeping track of previously requested destinations in the destination history data 317 and the number of times the corresponding destination was requested in the form of the destination count and the date/time of each request. The map/location/routing module 326 also stores software enabling the user to flag locations. The map/location/routing module 326 may also receive GPS location information 332 indicating the current location of the vehicle, so that it may use the GPS location information 332 when determining the directions to the requested location.

The controller 310 controls the operation of the various components in the vehicle navigation system 300, including the speech recognition module 304, the display 312, the shortcut registration module 314, the user profile DB 316, the touch sensitive screen 324, the map/location/routing module 326, and the speech synthesis module 328. To this end, the controller 310 executes instructions or programs stored in the shortcut registration module 314 to register or deregister a shortcut name. The controller 310 also executes instructions or programs stored in the map/location/routing module 326, to keep track of and store previously requested destinations in the destination history data 317 and the number of times the corresponding destination was requested, in addition to the conventional functions of displaying the current location of the vehicle and showing directions to a particular destination from the current location. The controller 310 also executes the software stored in the speech recognition module 304 to perform speech recognition on the speech 301 input from the user.

The display device 312 displays information used for interaction with the user of the vehicle navigation system 300. For example, the display device 312 displays an interactive map in order to indicate the current location of the vehicle as well as directions to a destination requested by the user. The display device 312 is preferably a liquid crystal display (LCD), although other types of display devices may be used.

The touch sensitive screen 324 is overlapped with the display device 312 in order to provide the user with capabilities of entering commands and data on an interactive display. The touch sensitive screen 324 may be used as input keys to enter data and commands to the navigation system 300. For example, the touch sensitive screen 324 may be used to input destination addresses to the navigation system 300 as described in step 104 of FIG. 1. The touch sensitive screen 324 is preferably a conventional resistive-type touch sensitive screen, although other types of touch sensitive screens or conventional input switches may be used.

The speaker 311 provides an alternative output means by which the navigation system 300 may communicate messages, such as directions to a destination, to the user. The speech synthesis module 328 either synthesizes speech corresponding to those messages or selects pre-stored speech waveforms corresponding to those messages, so that the synthesized or selected speech may be output to the user using the speaker 311.

FIG. 4 is a diagram illustrating an example of a database entry 400 corresponding to one user in the user profile database 316 of the vehicle navigation system 300 of FIG. 3. Although FIG. 4 shows an example of one entry in the user profile database 316, it should be noted that there could be a plurality of entries corresponding to a plurality of users of the navigation system 300.

Referring to FIG. 4, the database entry 400 includes a user identification 321, destination history data 317, and shortcut data 319. The destination history data 317 includes destination addresses 404, destination Geo-codes 406 each corresponding to the addresses 404, destination counts 408 each corresponding to the destination addresses 404, and the dates/times 410 when the corresponding destinations were requested. The shortcut data 319 includes a list of shortcut names 412, a list of shortcut destinations 416 each corresponding to the shortcut names 319, and shortcut count 414 indicating the number of times the shortcut destinations were requested.

The user identification 321 is a name, "John Doe," although other identifications such as user identification numbers or log-on names may be used. The destination addresses 404 are addresses to which the user previously requested directions by speech through the speech recognition system or by manual input through the touch sensitive screen or input keys. The destinations listed in the destination history data 317 may be what the user previously requested by speech or by manual input through a touch sensitive screen or input keys. The destinations listed in the destination history data 317 may also be allocation marked (flagged) on the navigation system by the user on the way he was driving to another location. The Geo-codes 406 correspond to each of the destination addresses 404 and indicate the latitude and longitude of the corresponding address. The destination count 408 keeps track of the number of times the user requested directions to the corresponding destination. The dates/times 410 are the dates and times at which the corresponding destination was requested. For example, as illustrated in FIG. 4, the user requested directions to "100 A Street, Palo Alto, Calif." at 37.4447, −122.1608 once at 12:49 on Oct. 25, 2003, to "200 B Street, Los Altos, Calif." at 37.4567, −122.1702 once at 14:20 on Oct. 27, 2003, to "300 C Street, Mountain View, Calif." at 37.5012, −122.1745 twice at 07:30 of Oct. 28, 2003 and 15:24 of Oct. 29, 2003, and "BurgerQueen, 400 D Street, Sunnyvale, Calif." at 37.4447, −122.1745 twice at 09:50 of Oct. 24, 2003 and 10:45 of Oct. 26, 2003. The destination count 408 is used to determine whether the newly requested destination is a frequently requested destination as illustrated in, e.g., step 110 of FIG. 1. In an embodiment in which destinations requested twice are considered frequently requested destinations, if any of the destinations listed in the destination history 408 is requested again within a certain period of time, such destination will be determined to be a frequently requested destination.

The shortcut names 412 are what the user of the navigation system or speech recognition system has registered previously by speech recognition, in order to refer to refer to the corresponding destinations 416 in a simplified way. Also, the shortcut count 414 keeps track of the number of times the corresponding shortcut name was used. For example, the shortcut name "My Work" corresponds to "4009 Miranda Avenue, Palo Alto, Calif." and was used once, "My Grocery Store" corresponds to "500 A Street, Santa Clara, Calif." and was used three times, "John's House" corresponds to "600 B Street, Redwood City, Calif." and was used once, "Driving Range" corresponds to "700 C Street, Cupertino, Calif." and was used twice, and "My Favorite Japanese Restaurant" corresponds to "800 D Street, San Jose, Calif." and was used once. The shortcut names 412 were previously registered by speech recognition of the shortcut names that were stated by the user, for example, as described in step 114 of FIGS. 1A and 1B. The shortcut names are also stored in the grammar database 308 shown in FIG. 3, so that the speech recognition module 304 may recognize the shortcut names by speech recognition. The shortcut count 414 may be used to increase the weight given to the frequently used shortcut names stored in the grammar database 308, so that the speech recognition module 304 performs more accurately. The shortcut count 414 may also be used to suggest to the user deletion of certain shortcut names that are not used for a certain period of time or if the memory storing the shortcut names become full.

Although the present invention has been described above with respect to several embodiments, various modifications can be made within the scope of the present invention. For example, although the methods of registering, using, or deregistering the shortcut names of the present invention were described in the context of a speech recognition system used in a navigation system, similar methods may be used with shortcut names corresponding to longer speech (e.g., phrase or sentence) in a general speech recognition system that is used independently or in combination with systems other than a navigation system. In such embodiments, the shortcut names do not necessarily correspond to destination addresses, but may correspond to any type of longer speech (e.g., phrase or sentence). Therefore, the present invention is not limited to a speech recognition system used in navigation systems, but may cover shortcut names used with any type of speech recognition systems. Accordingly, the disclosure of the present invention is intended to be illustrative, but not limiting, of the scope of the invention, which is set forth in the following claims.

What is claimed is:

1. A method of registering a shortcut name corresponding to a destination for a speech recognition system in a vehicle navigation system, the method comprising:

receiving a destination to which directions are requested from the user;

determining whether the received destination is a frequently requested destination;

responsive to determining that the received destination is a frequently requested destination, receiving a shortcut name corresponding to the received destination as speech from the user and recognizing the shortcut name by speech recognition; and registering the shortcut name to a personal profile of the user.

2. The method of claim 1, further comprising adding the shortcut name to a grammar database of the speech recognition system.

3. The method of claim 1, wherein receiving the shortcut name comprises:

prompting the user whether a shortcut should be registered for the received destination;

responsive to receiving an indication from the user that a shortcut should be registered for the received destination, receiving the shortcut name corresponding to the received destination from the user as speech.

4. The method of claim 1, wherein receiving a destination from a user comprises receiving the destination in the form of speech from the user.

5. The method of claim 1, wherein receiving a destination from a user comprises receiving the destination by manual input of the destination by the user through a touch sensitive screen or input keys.

6. The method of claim 1, further comprising storing the received destination as destination history data in the user's personal profile.

7. The method of claim 1, wherein determining whether the received destination is a frequently requested destination comprises comparing the received destination with destination history data stored in the user's personal profile.

8. The method of claim 7, wherein the received destination is determined to be a frequently requested destination based upon the number of times the received destination was requested in a predetermined period of time.

9. The method of claim 1, further comprising determining whether the received shortcut name as a whole is duplicative of, or has a pronunciation similar to, a previously registered shortcut name or a recognizable word stored in a grammar database of the speech recognition system, prior to registering the received shortcut name.

10. A method of registering a shortcut name corresponding to a sentence or phrase for use in a speech recognition system, the method comprising:

receiving a sentence or phrase from the user;

determining whether the received sentence or phrase is a frequently stated sentence or phrase;

responsive to determining that the received sentence or phrase is a frequently stated sentence or phrase, receiving a shortcut name corresponding to the sentence or phrase as speech from the user and recognizing the shortcut name by speech recognition; and registering the shortcut name to a personal profile of the user.

11. The method of claim 10, further comprising adding the shortcut name to a grammar database of the speech recognition system.

12. The method of claim 10, wherein receiving the shortcut name comprises:
prompting the user whether a shortcut should be registered for the received sentence or phrase; and
responsive to receiving an indication from the user that a shortcut should be registered for the received sentence or phrase, receiving the shortcut name corresponding to the received sentence or phrase from the user.

13. The method of claim 10, further comprising storing the received sentence or phrase as history data in the user's personal profile.

14. The method of claim 10, wherein determining whether the received sentence or phrase is a frequently stated sentence or phrase comprises comparing the received sentence or phrase with history data stored in the user's personal profile.

15. The method of claim 14, wherein the received sentence or phrase is determined to be a frequently stated sentence or phrase based upon the number of times the received sentence or phrase was requested in a predetermined period of time.

16. The method of claim 10, further comprising determining whether the received shortcut name as a whole is duplicative of, or has a pronunciation similar to, a previously registered shortcut name or a recognizable word stored in a grammar database of the speech recognition system, prior to registering the received shortcut name.

17. A method of registering a shortcut name corresponding to a flagged destination for a speech recognition system in a vehicle navigation system, the method comprising:
receiving a flagged location from the user, the flagged destination being a location marked on the vehicle navigation system as a location of interest to the user;
receiving a shortcut name corresponding to the flagged location as speech from the user and recognizing the shortcut name by speech recognition; and
registering the shortcut name to a personal profile of the user.

18. The method of claim 17, further comprising adding the shortcut name to a grammar database of the speech recognition system.

19. The method of claim 17, wherein receiving the shortcut name comprises:
prompting the user whether a shortcut should be registered for the flagged location;
responsive to receiving an indication from the user that a shortcut should be registered for the flagged location, receiving the shortcut name corresponding to the flagged location from the user as speech.

20. The method of claim 17, further comprising determining whether the received shortcut name as a whole is duplicative of, or has a pronunciation similar to, a previously registered shortcut name or a recognizable word stored in a grammar database of the speech recognition system, prior to registering the received shortcut name.

* * * * *